United States Patent [19]

Henry et al.

[11] 4,086,184

[45] Apr. 25, 1978

[54] REACTIVATION OF DEACTIVATED HYDROCARBON CONVERSION CATALYST BY ULTRASONIC INSONATION

[75] Inventors: H. Clarke Henry, Sarnia; Ramaswami Ranganathan, Saskatoon, both of Canada

[73] Assignee: Exxon Research & Engineering Co., Linden, N.J.

[21] Appl. No.: 356,570

[22] Filed: May 2, 1973

[51] Int. Cl.$^2$ .................... B01J 29/38; B01J 23/94; B01J 23/96; B01J 23/20

[52] U.S. Cl. .................... 252/414; 208/108; 208/111; 252/412; 252/416

[58] Field of Search ............... 252/414, 412, 416, 413; 134/1; 204/158 S; 208/111

[56] References Cited

U.S. PATENT DOCUMENTS

| | | | |
|---|---|---|---|
| 3,093,597 | 6/1963 | Hill et al. ............................. | 252/413 |
| 3,151,059 | 9/1964 | Foster et al. ...................... | 252/411 R |
| 3,231,513 | 1/1966 | Graves et al. ........................... | 134/1 |
| 3,373,102 | 3/1968 | Schulman .............................. | 252/414 |
| 3,461,064 | 8/1969 | Hamilton et al. ..................... | 252/414 |
| 3,505,206 | 4/1970 | Decker .................................. | 252/414 |
| 3,505,207 | 4/1970 | Haney et al. .......................... | 252/414 |
| 3,524,822 | 8/1970 | Frankovich et al. ................ | 252/416 |
| 3,562,150 | 2/1971 | Hamilton et al. ..................... | 252/412 |
| 3,565,820 | 2/1971 | Coons, Jr. et al. ................... | 252/414 |
| 3,591,522 | 7/1971 | Cosyns et al. ........................ | 252/414 |

*Primary Examiner*—Winston A. Douglas
*Assistant Examiner*—P. E. Konopka
*Attorney, Agent, or Firm*—Edward M. Corcoran

[57] ABSTRACT

Catalysts used in hydrocarbon conversion operations are subject to "permanent" deactivation after successive use and regeneration. These permanently deactivated catalysts can be reactivated by immersing them in a liquid medium and subjecting the liquid medium to ultrasonic energy. This reactivation is especially suitable to catalyst mixtures, comprising (1) an amorphous base and/or (2) a crystalline aluminosilicate component and/or (3) a transition metal hydrogenation component, particularly those employed in hydrocracking operations.

21 Claims, No Drawings

REACTIVATION OF DEACTIVATED HYDROCARBON CONVERSION CATALYST BY ULTRASONIC INSONATION

BACKGROUND OF THE INVENTION

1. Field of the Invention

This invention relates to the reactivation of catalysts (particularly amorphous base and crystalline aluminosilicate catalysts) used in hydrocarbon conversion reactions. More particularly, the invention is directed to a method for reactivating said catalysts which have become damaged, i.e., "permanently" deactivated, due to excessive heat and/or steam during hydrocarbon conversion operation and which are no longer capable of regeneration by combustion of carbonaceous deposits thereon, or by the usual chemical processes.

2. Description of the Prior Art

The use of catalysts to effect hydrocarbon conversion processes, such as cracking, hydrocracking and reforming is well known. These catalysts include amorphous types, crystalline types and mixed amorphous types. Regardless of the type of catalyst used, these hydrocarbon conversion reactions result in the deposition on the catalyst of a carbonaceous deposit, commonly called coke, and other contaminants such as inorganic oxides. These deposits cover the surface and fill the pores of the catalyst, with consequent decline in catalytic activity. Under conditions of operation, it is necessary to terminate conversion operations after a relatively short time, for example, five to fifteen minutes onstream, and then to restore the activity of the catalyst by burning off or chemically removing the contaminant in a regeneration stage. Methods of regenerating such "temporarily" deactivated catalysts are well known. However, it has been found that, after repeated exposure to hydrocarbon feed particularly under severe conditions such as cracking or hydrocracking, the catalysts become so deactivated that conventional removal of the accumulated coke and oxide deposit does not result in the catalyst regaining an appreciable or adequate percentage of its original activity. During the long exposure to hydrocarbon conversion conditions, the catalysts become fouled by contaminants which cannot be removed by the ordinary regeneration processes. This deactivation is referred to as "permanent" deactivation. Unless satisfactory means are found for restoring to activity the catalyst or portions thereof which are "permanently" deactivated, the catalyst must be replaced.

The term "permanent" as used herein with respect to deactivated catalysts should be understood to relate to a deactivated hydrocarbon-conversion catalyst which cannot be restored to satisfactory catalytic efficiency through the ordinary regeneration processes such as calcining or chemical treatment.

Various methods have been suggested for reactivation of permanently deactivated hydrocarbon-conversion catalysts. For example, U.S. Pat. No. 3,256,205, issued June 14, 1966, to Constabaris et al., teaches that a permanently deactivated hydrogenation catalyst having a supported Group VIII metal can be "rejuvenated" by treatment with strong acid, having a pH of 2 or lower, prior to the usual regenerative step. U.S. Pat. No. 3,451,942, issued June 24, 1969, issued to Bertolacini, discloses a rejuvenating process involving the separate steps of treatment with nitrogen-oxide-affording material, treatment with oxygen, and treatment with hydrogen. U.S. Pat. No. 3,533,959, issued Oct. 13, 1970, to Miale et al., uses a chelating agent capable of reacting with aluminum in order to reactivate deactivated zeolite catalysts. U.S. Pat. No. 3,684,738, issued Aug. 15, 1972, to Chen, treats certain zeolite catalysts of specific silica/alumina mole ratio and specific pore size with hydrogen ions. While some of these prior art methods have been quite satisfactory in some limited instances, others failed to give good results or have been economically unattractive. There are heretofore not been a simple, relatively inexpensive method of reactivating permanently deactivated hydrocarbon-conversion catalysts, which is applicable to substantially all of the various catalysts in current commercial use.

It is therefore an object of this invention to provide a method for reactivating permanently deactivated hydrocarbon-conversion catalysts, which would be relatively simple in operation and economically attractive. It is a further object of this invention to provide a reactivating method which would be applicable to a broad spectrum, i.e., substantially all of the hydrocarbon-conversion catalysts in current use. Other objects of this invention will become apparent from the following discussion.

SUMMARY OF THE INVENTION

In accordance with the present invention, it has been discovered that "permanently" deactivated hydrocarbon-conversion catalysts can be reactivated by ultrasonic insonation of the catalyst in a liquid medium. The insonation may take place either within the hydrocarbon-conversion reactor, or outside of it. Also, the insonation may be done either before or after the usual catalyst regeneration steps.

The use of ultrasonic insonation in the preparation of certain catalysts and in the initiation of catalytic reactions is well known and is more fully described in Ranganathan et al, Journal of Catalysis, Vol. 21, page 186–198 (1971). U.S. Pat. No. 3,231,513, issued Jan. 25, 1966, to Groves, et al., teaches that certain catalysts, such as the brass catalyst used in the conversion of isopropyl alcohol to acetone, can be regenerated through the use of ultrasonic insonation.

The catalysts which may be reactivated according to the practice of this invention include substantially all catalysts usable in hydrocarbon-conversion processes, such as amorphous, crystalline, and mixed amorphous-crystalline types. This invention is particularly applicable to amorphous-type crystalline and aluminosilicates such as the natural and synthetic zeolites.

Catalysts usable in all hydrocarbon conversion reactions may be treated by the methods of this invention. Included in these reactions are the processes of cracking, hydrocracking, reforming, hydroisomerization, alkylation, disproportionation, etc. The invention is particularly suited, however, to the more severe hydrocarbon conversions, such as cracking and hydrocracking and most particularly to hydrocracking.

Preferably, the starting catalyst composition comprises a mixture of a major amount of an amorphous component and a minor amount of a hydrogenation component preferably comprising one or more transitional metals selected from Groups VIB and/or VIII of the Periodic Table and the oxides and sulfides thereof.

Representative of these metals are molybdenum, chromium, tungsten, nickel, cobalt, palladium, iron, rhodium, and the like, as well as combinations of these metals and/or their oxides and/or sulfides. Preferred metals are nickel, molybdenum and mixtures thereof.

One or more of the metals, metal oxides or sulfides, alone or in combination, may be added to the support in minor proportions ranging from 1 to 25 wt. % based on the total catalyst.

The amorphous component, i.e., support, can be one or more of a large number of non-crystalline materials having high porosity. The porous material is preferably inorganic but can be organic in nature if desired. Representative porous materials that can be employed include metals and metal alloys; sintered glass; firebrick; diatomaceous earth; inorganic refractory oxides; organic resins, such as polyesters, phenolics and the like; metal phosphates such as boron phosphate, calcium phosphate and zirconium phosphate; metal sulfides such as iron sulfide and nickel sulfide; inorganic oxide gels and the like. Preferred inorganic oxide support materials include one or more oxides of metals selected from Groups IIA, IIIA and IV of the Periodic Table. Non-limiting examples of such oxides include aluminum oxide, titania, zirconia, magnesium oxide, silicon oxide, titanium oxide, silica-stabilized alumina and the like.

Preferably, the starting catalyst composition comprises a silica/alumina support containing molybdenum trioxide and nickel oxide hydrogenation components. The silica:alumina weight ratio in the amorphous support can range from 20:1 to 1:20 and preferably from 1:4 to 1:6. The molybdenum trioxide:nickel oxide weight ratio in the amorphous support can range from about 1:25 to 25:1 and preferably from 2:1 to 4:1. Finally, the weight ratio of the support to the hydrogenation component can range from about 20:1 to 1:20 and preferably from 4:1 to 6:1. The catalyst is preferably presulfided by conventional methods such as by treatment with hydrogen sulfide or carbon disulfide prior to use. The precise chemical identity of the hydrogenation constituents present on the support during the course of the hydrocracking operation is not known. However, the hydrogenation components probably exist in a mixed elemental metal/metal oxide/metal sulfide form.

Secondly, low sieve-content catalysts consisting of a mixture of a major amount of an amorphous component and minor amounts of (1) a crystalline aluminosilicate component comprising less than about 9 wt. %, preferably less than about 5 wt. % of the total catalyst and (2) a hydrogenation component, can be used. The catalyst may also contain a small amount of $P_2O_5$, which acts to stabilize the catalyst against decomposition. The amorphous component (support) is similar to that described above. The hydrogenation component is preferably a transitional metal selected from Groups VIB and VIII of the Periodic Table and/or the oxides, and/or sulfides thereof. Useful catalyst metals include chromium, molybdenum, tungsten, platinum, palladium, cobalt, nickel, etc. One such catalyst comprises 95 wt. % based on total catalyst of $NiO/MoO_3$ on a $SiO_2/Al_2O_3$ base (stabilized with $P_2O_5$) and 5 wt. % based on total catalyst of nickel-exchanged faujasite. In general, the aluminosilicate can be a material of the type, more fully described hereafter, that is employed in the third example of suitable hydrocracking catalysts.

The catalysts may be prepared by any of the general methods described in the art such as by cogelation of all the components, by impregnation of the support with salts of the desired hydrogenating components, by deposition, by mechanical admixture and the like.

A third example of the hydrocracking catalysts which can be used in the practice of this invention comprises a mixture of (1) an amorphous component, (2) 10 to 70 wt. % (based on total catalyst) of a crystalline aluminosilicate component and (3) a hydrogenation component. Catalysts of this type are exemplified and described more completely in U.S. Pat. Nos. 3,547,807, 3,304,254 and 3,304,808.

Preferably, the catalyst comprises a mixture of (1) a major component comprising an amorphous support upon which is deposited one or more transitional metal hydrogenation components, preferably selected from Groups VIB and VIII metals of the Periodic Table and/or the oxides and/or sulfides thereof and (2) a minor component comprising a crystalline aluminosilicate zeolite having a silica:alumina mole ratio greater than about 2.5 and an alkali metal content of less than 2.0 wt. % (as alkali metal oxide) based on the final aluminosilicate composition, and containing deposited thereon or exchanged therewith one or more transitional metal hydrogenation components preferably selected from Group VIB and VIII metals of the Periodic Table and/or the oxides and/or sulfides thereof.

The amorphous component (support) of this third exemplified catalyst is similar to that used in the first exemplified catalyst and can be one or more of a large number of noncrystalline materials having high porosity. The porous support is desirably inorganic; however, it may be an organic composition. Representative porous support materials include diatomaceous earth; sintered glass; firebrick; organic resins; alumina; silica-alumina; zirconia; titania; magnesia metal halides; sulfates, phosphates; silicates; and the like. Preferably, alumina or silica-stabilized alumina (desirably 1–5 wt. % silica based on total support) is employed.

Suitable hydrogenation components that can be added to the porous support are the transitional metals and/or the oxides and/or sulfides thereof. The metals are preferably selected from Groups VIB and VIII of the Periodic Table and are exemplified by chromium, molybdenum, tungsten, cobalt, nickel, palladium, iron, rhodium, and the like. The metals, metal oxides or sulfides may be added alone or in combination to the support. The preferred hydrogenation components are nickel, tungsten and molybdenum metals and the oxides and/or sulfides thereof. In use the hydrogenation components probably exist in a mixed metal/metal oxide of metal/metal oxide/metal sulfide form. The hydrogenation components are added to the support in minor proportions ranging from about 1 to 25% by weight based on the total amorphous component of the catalyst. The hydrogenation components that are deposited on the porous support can be the same as or different from the hydrogenation components used in the crystalline aluminosilicate component of the catalyst.

The amorphous component can be prepared in any suitable manner. Thus, for example, if silica-alumina is employed, the silica and alumina may be mechanically admixed or, alternatively, chemically composited with the metal oxides such as by cogelation. Either the silica or alumina may, prior to admixture with the other, have deposited thereon one or more of the metal oxides. Alternatively, the silica and alumina may first be admixed and then impregnated with the metal oxides.

A preferred amorphous component comprises alumina containing nickel oxide and tungsten oxide or molybdenum oxide. The weight ratio of nickel oxide to tungsten oxide or molybdenum oxide can range from about 1:25 to 25:1 and preferably from 1:4 to 1:6. Finally, the weight ratio of the support to total metal oxide can range from about 20:1 to 1:20 and preferably from 4:1 to 8:1.

The crystalline aluminosilicate (sieve component) employed in the preparation of the crystalline component of this third exemplified catalyst is similar to that used in the low sieve-content catalysts employed in the second exemplified and comprises one or more natural or synthetic zeolites. Representative examples of particularly preferred zeolites are zeolite X, zeolite Y, zeolite L, faujasite and mordenite. Synthetic zeolites have been generally described in U.S. Pat. Nos. 2,882,244, 3,130,007 and 3,216,789 and elsewhere.

The silica:alumina mole ratio of useful aluminosilicates is greater than 2.5 and preferably ranges from about 2.5 to 10. More preferably this ratio ranges between about 3 and 6. These materials are essentially the dehydrated forms of crystalline hydrous siliceous zeolites containing varying quantities of alkali metal and aluminum with or without other metals. The alkali metal atoms, silicon, aluminum and oxygen in the zeolites are arranged in the form of an aluminosilicate salt in a definite and consistent crystalline structure. The structure contains a large number of small cavities, interconnected by a number of still smaller holes or channels. These cavities and channels are uniform in size. The pore diameter size of the crystalline aluminosilicate can range from 5 to 15 A and preferably from 5 to 10 A.

The aluminosilicate component may comprise a sieve of one specific pore diameter size or, alternatively, mixtures of sieves of varying pore diameter size. Thus, for example, mixtures of 5 A and 13 A sieves may be employed as the aluminosilicate component. Synthetic zeolites such as type-Y faujasites are preferred and are prepared by well-known methods such as those described in U.S. Pat. No. 3,130,007.

The aluminosilicate can be in the hydrogen form, in the polyvalent metal form or in the mixed hydrogen-polyvalent metal form. The polyvalent metal or hydrogen form of the aluminosilicate component can be prepared by any of the well-known methods described in the literature. Representative of such methods is ion-exchange of the alkali metal cations contained in the aluminosilicate with ammonium ions or other easily decomposable cations such as methyl-substituted quaternary ammonium ions. The exchanged aluminosilicate is then heated at elevated temperatures of about 300°–600° C. to drive off ammonia, thereby producing the hydrogen form of the material. The degree of polyvalent-metal or hydrogen exchange should be at least about 20%, and preferably at least about 40% of the maximum theoretically possible. In any event, the crystalline aluminosilicate composition should contain less than about 6.0 wt. % of the alkali metal oxide based on the final aluminosilicate composition and, preferably, less than 2.0 wt. %, i.e., about 0.3 wt. % to 0.5 wt. % or less.

The resulting hydrogen aluminosilicates can be employed as such, or can be subjected to a steam treatment at elevated temperatures, i.e., 800° to 1300° F. for example, to effect stabilization, thereof, against hydrothermal degradation. The steam treatment, in many cases, also appears to effect a desirable alteration in crystal structures resulting in improved selectivity.

The mixed hydrogen-polyvalent metal forms of the aluminosilicates are also contemplated. In one embodiment the metal form of the aluminosilicate is ion-exchanged with ammonium cations and then partially back-exchanged with solutions of the desired metal salts until the desired degree of exchange is achieved. The remaining ammonium ions are decomposed later to hydrogen ions during thermal activation. Here again, it is preferred that at least about 40% of the monovalent metal cations be replaced with hydrogen and polyvalent metal ions.

Suitably, the exchanged polyvalent metals are transition metals and are preferably selected from Groups VIB and VIII of the Periodic Table. Preferred metals include nickel, molybdenum, tungsten and the like. The most preferred metal is nickel. The amount of nickel (or other metal) present in the aluminosilicate (as ion-exchanged metal) can range from about 0.1 to 20% by weight based on the final aluminosilicate composition.

In addition to the ion-exchanged polyvalent metals, the aluminosilicate may contain as non-exchanged constitutents one or more hydrogenation components comprising the transitional metals, preferably selected from Groups VIB and VIII of the Periodic Table and their oxides and sulfides. Such hydrogenation components may be combined with the aluminosilicate by any method which gives a suitably intimate admixture, such as by impregnation. Examples of suitable hydrogenation metals, for use herein, include nickel, tungsten, molybdenum, platinum, and the like, and/or the oxides and/or sulfides thereof. Mixtures of any two or more of such components may also be employed. Particularly preferred metals are tungsten and nickel. Most preferably, the metals are used in the form of their oxides. The total amount of hydrogenation components present in the final aluminosilicate compositon can range from about 1 to 50 wt. %, preferably from 10 to 25 wt. % based on the final aluminosilicate composition. The final weight % composition of the crystalline component of the total catalyst will range from about 10 to 70 wt. % and preferably from about 10 to 30 wt. %, i.e. 20 wt. % based on total catalyst.

The amorphous component and the crystalline aluminosilicate component of this third exemplified catalyst may be brought together by any suitable method, such as by mechanical mixing of the particles thereby producing a particle form composite that is subsequently dried and calcined. The catalyst may also be prepared by extrusion of wet plastic mixtures of the powdered components followed by drying and calcination. Preferably the complete catalyst is prepared by mixing the metal-exchanged zeolite component with alumina or silica-stabilized alumina and extruding the mixture to form catalyst pellets. The pellets are thereafter impregnated with an aqueous solution of nickel and molybdenum or tungsten materials to form the final catalyst.

Although the foregoing specifically exemplified catalysts discussed in some detail are mixed crystalline/amorphous catalysts, the practice of this invention is not specifically limited thereto. As noted above, the invention is equally applicable to catalysts consisting wholly of crystalline material or wholly of amorphous material.

Furthermore, although the foregoing detailed discussion of catalysts was limited to hydrocracking catalysts, the process of this invention is also applicable to other hydrocarbon conversion processes, as noted above. Thus, for example, the catalyst treated by ultrasonic insonation can be a platinum/rhenium catalyst used in reforming.

The liquid medium in which the insonation takes place may be any liquid which (1) does not react with the catalyst, (2) that is "clean," i.e., will not deposit other impurities on the catalyst surface, and (3) is viscous under the temperature conditions obtaining. Preferably, an organic liquid is used, one which has a relatively high solvent power for the contaminants removed from the catalyst and which will easily volatize. In addition, however, mineral oils and white oils can be used, as well as inorganic liquids.

The insonation is accomplished by agitating the liquid medium (containing the deactivated catalyst) by means of ultrasonic energy. The ultrasonic energy may have a frequency range of from about 18 to about 500 kilohertz. It has been found that the frequencies in the lower portion of this range, from about 18 to about 22 kilohertz produces satisfactory results and is therefore preferred. The lower output of the ultrasonic unit should be maintained as high as possible. For this reason, particularly, the transducer employed in the unit is preferably a magnetostrictive device, rather than a quartz or barium titanate transducer. The power output of the transducer should be at least about 6 watts per square inch, but is preferably higher, for example, about 10 to 40 watts per square inch.

The time required for the ultrasonic insonation treatment will increase as the ultrasonic energy level is decreased. Time will also be dependent upon the particular catalyst being treated and the degree of fouling on the catalyst. In general, it is expected that treatment times will vary from about 5 to about 30 minutes. The energy level also depends on the temperature of the liquid medium. In general, any temperature at which the liquid medium is sufficiently viscous can be used.

The insonation process may take place outside the conversion reactor or, alternatively, within the reactor. The preferred method is in situ insonation, i.e., within the reactor. This comprises the steps of removing the feedstock from the reactor, and thereafter filling the catalyst bed with liquid medium and applying high frequency ultrasonic energy. After the time necessary to reactivate the catalyst, the hydrocarbon conversion process is resumed. If the insonation process takes place outside the reactor, catalyst is physically withdrawn, preferably prior to regeneration, placed in the liquid medium and high frequency ultrasonic energy applied. When the liquid medium used in a petroleum based solvent, it is not necessary to remove it prior to resuming the hydrocarbon conversion reaction. However, if the liquid medium is an inorganic solvent or a volatile organic solvent, it is generally removed prior to the start of the hydrocarbon conversion.

As noted above, the ultrasonic insonation reactivation process is preferably done prior to catalyst regeneration. If more convenient, however, it may be done subsequent to the usual catalyst regeneration step. The advantage to prior insonation is that, during the subsequent regeneration, the impurities dislodged by the insonation may be readily removed, e.g., by burning off during calcination, or by chemical removal.

In the hydrocarbon conversion processes improved by the practice of this invention, any feedstock to which the particular process is applicable may be used. This invention is particularly applicable to hydrocracking and any feedstock which is appropriate for this process can be used. For example, in a hydrocracking process for the for the production of lubricating oils, the predominant portions of the hydrocarbons should exhibit boiling points above about 650° F. Such feedstocks include crude oil vacuum distillates from paraffinic (i.e., waxy) or naphthenic crudes, deasphalted residual oils, the heaviest fractions of catalytic cracking cycle oils, coker distillates and/or thermally cracked oils, heavy vacuum gas oils and the like. These fractions may be derived from petroleum oils that exhibit initial boiling points in the range of from about 930° to 1050° F. and have a Conradson carbon residue number less than about 3, and heavy gas oils that boil predominantly between about 650° and 1050° F. and exhibit viscosities ranging from about 35 to 200, preferably 40 to 100, SUS at 210° F.

In addition to reactivating permanently deactivated catalysts, the above-described insonation process may also be used on fresh catalyst. It has been discovered that said process also improves the activity of fresh catalyst.

THE PREFERRED EMBODIMENT

The advantages resulting from the practice of this invention are illustrated in the following examples.

In these examples, the catalyst used was a conventional hydrocracking catalyst comprising nickel-molybdenum on an amorphour support. The catalyst specifications are given in Table I.

TABLE I

| Form | 1/16" extrudate |
|---|---|
| Component, wt.% | |
| Ni | 4.5 |
| $MoO_3$ | 13.0 |
| $Na_2O$ | 0.07 |
| Fe | 0.03 |
| $SiO_2$ | 15.0 |
| $Al_2O_3$ | remainder |
| Physical Properties | |
| Surface Area, $m^2$/gm | 360 |
| Pore Volume, $cm^3$/gm ($CCl_4$) | 0.50 |
| Density, gm/cc | 0.56 |
| Strength, lbs. crush (avg.) | 12 |
| Attrition Index | 92 |
| % retained on a 20 mesh sieve after tumbling for one hour | |

Spent catalyst as described above that had been considerably deactivated from 461 hours of previous operation in hydrocracking of a heavy Cylinder Stock was regenerated in the laboratory by heating the catalyst to 950° F in a Lindberg furnace in the presence of a 100 SCF/hr. air purge for 16 hours.

The Cylinder Stock had the characteristics shown in Table II.

TABLE II

| $V_{210}SUS$ | 191.9 |
|---|---|
| °API | 20.4 |
| R.I. at 60° C | 1.5052 |
| S, wt.% | 0.54 |
| N, ppm | 2300 |
| Fe, ppm | 1.0 |
| Ni, ppm | 0.65 |
| V, ppm | 1.85 |
| Dewaxed Oil | |
| Dry Wax, wt.% | 7.0 |
| $V_{100}SUS$ | 8743 |
| $V_{210}SUS$ | 216 |
| $VI_E$ | 41 |

Samples of this regenerated catalyst were then insonated at two severities; that is, 35 watts at 19 kHz and 80 watts at 90 kHz. This was accomplished by suspending 150 cc of the regenerated catalyst in 300 cc of low viscosity white oil and subjecting the mixture to the ultrasonic waves for 1 hour. The low viscosity white oil has the following physical properties: color — 30 Saybolt; COC/° F—340; specific gravity — 0.845 - 0.855; pour point — 0° F; viscosity at 100° F (SUS) — 75-85.

Following the insonation operation, the catalyst was Soxhlet-extracted with hexane for 6 hours to remove any traces of white oil. Before measuring the activity, each catalyst was calcined and sulfided following these steps:

CATALYST TREATMENT AFTER INSONATION

1. Calcine catalyst in Lindberg furnace — 2 hours at 900° F, 50 SCF/hr. air purge.
2. Pack catalyst in reactor.
3. Pressure test cold with $N_2$ and $H_2$ at 2500 psig.
4. Purge with $N_2$ approximately 15 minutes to clear $H_2$.
5. Heat to 400° F in $N_2$ purge at atm. pressure.
6. Pressure test with $N_2$ at 400° F, 2500 psig.
7. Begin sulfiding (10% $H_2S/H_2$) at 400° F, 600 psig, 500 v/v/hr.
8. Hold for 12 hours.
9. Heat to 600° F maintaining 600 psig, 500 v/v/hr.
10. Hold for 12 hours.
11. Hot pressure test with $H_2$ at 600° F, 2500 psig.
12. Cool in $H_2$ purge to approximately 400° F.

A pilot plant sandbath hydrotreating reactor was used which had an internal diameter of 1.16 inches and a centrally located thermowell with an outside diameter of 0.375 inches. The reactor operated in a single-pass, isothermal, concurrent-downward flow operation. For each experiment 130 cc of catalyst was packed in the reactor with 8 inches of stainless steel packing above and 10 inches below the catalyst to promote good liquid distribution throughout the bed.

Following the sulfiding operation, each catalyst was "run in" on a petroleum distillate feed for approximately 45 hours to ensure that steady state operation was achieved.

The distillate used was a 600°–700° F distillate from Tia Juana 102 crude having a sulfur content of 1.2 wt.% based on total feed and a nitrogen content of 0.04 wt.% based on total feed.

This "run in" hydrotreating operation was at 700° F, 0.5 v/v/hr., 2500 psig pure $H_2$ and 5000 $H_2$/B. Inspections on the reactor total liquid products from the distillate at the end of the "run ins" are shown in Table III.

TABLE III

| | CATALYST ACTIVITY FOR HYDROCRACKING TJ102 DISTILLATE | | | | |
|---|---|---|---|---|---|
| Catalyst Sample | Feedstock | Fresh Catalyst | | Regenerated Catalyst | |
| Ultrasonic Regeneration | | | | | |
| Power, watts | — | 0 | 0 | 35 | 80 |
| Frequency, kHz | — | 0 | 0 | 19 | 90 |
| Hydrocracking Conditions | | | | | |
| Temperature, ° F | — | 700 | 700 | 700 | 700 |
| LHSV, v/v/hr. | — | 0.5 | 0.5 | 0.5 | 0.5 |
| Pressure, psig | — | 2500 | 2500 | 2500 | 2500 |
| Catalyst Age, Hr. | — | 40–44 | 43–45 | 41–45 | 39–45 |
| Liquid Product Inspections | | | | | |
| Recovery, wt.% | — | (100) | (100) | (100) | (100) |
| RI at 60° C | 1.4787 | 1.4492 | 1.4490 | 1.4420 | 1.4399 |
| Gravity, ° API | 27.5 | 35.4 | 35.5 | 38.2 | 38.9 |
| Color, ASTM | L4.5 | L0.0 | L0.0 | L0.0 | L0.0 |
| Sulfur, wt.% | 1.2 | — | — | — | — |
| Nitrogen, ppm | 400 | <1 | <1 | <1 | 3 |
| 550° F - Conversion[1], wt.% | 4.6 | 17.9 | 20.1 | 32.8 | 33.6 |

[1]By G.C. Distillation

For hydrotreating the TJ102 distillate, both sulfur and nitrogen removal was greater than 99% for each catalyst batch studied. Conversion to components boiling below 550° F was considerably improved by the ultrasonic treatment at both ultrasonic post-treatment severity levels compared to the regenerated catalyst activity. In addition, the ultrasonic insonated catalyst samples exhibited a greater conversion activity than the fresh catalyst. This indicates that the ultrasonic treatment is beneficial for improving the activity of new fresh catalysts in addition to regenerated catalysts.

After the TJ102 LCT distillate "run ins" the activity of each catalyst was evaluated for hydrotreating a heavy vacuum gas oil at 0.5 v/v/hr., 1500 psig pure $H_2$ and 5000 SCF $H_2$/B and at two temperature levels 720° and 760° F (Tables IV and V).

TABLE IV

| | CATALYST ACTIVITY FOR HYDROCRACKING LIGHT ARABIAN HVGO | | | | |
|---|---|---|---|---|---|
| Catalyst Sample | Feedstock | Fresh Catalyst | | Regenerated Catalyst | |
| Ultrasonic Regeneration | | | | | |
| Power, watts | — | 0 | 0 | 35 | 80 |
| Frequency, kHz | — | 0 | 0 | 19 | 90 |
| Hydrocracking Conditions | | | | | |
| Temperature, ° F | — | 719 | 721 | 722 | 720 |
| LHSV, v/v/hr. | — | 0.49 | 0.47 | 0.47 | 0.49 |
| Pressure, psig | — | 1500 | 1500 | 1500 | 1500 |
| Catalyst Age, hr. | — | 85–133 | 85–133 | 85–133 | 85–133 |
| Liquid Product Inspections | | | | | |
| Recovery, wt.% | — | 97.3 | 98.4 | 97.5 | 97.8 |
| RI at 60° C | 1.5087 | 1.4736 | 1.4743 | 1.4712 | 1.4740 |
| Gravity, ° API | 19.5 | 28.5 | 28.5 | 29.4 | 28.4 |
| Color, ASTM | D8.0 | L2.5 | L3.0 | 2.5 | L3.0 |
| Sulfur, wt.% | 2.59 | 0.10 | 0.19 | 0.15 | 0.15 |
| Nitrogen, ppm | 1040 | 140 | 210 | 160 | 200 |
| 850° F - Conversion[1], wt.% | 12.0 | 44.0 | 38.0 | 40.7 | 37.0 |

[1]By G.C. Distillation

TABLE V

CATALYST ACTIVITY FOR HYDROCRACKING LIGHT ARABIAN HVGO

| Catalyst Sample | Feedstock | Fresh Catalyst | Regenerated Catalyst | | |
|---|---|---|---|---|---|
| Ultrasonic Regeneration | | | | | |
| Power, watts | — | 0 | 0 | 35 | 80 |
| Frequency, kHz | — | 0 | 0 | 19 | 90 |
| Hydrocracking Conditions | | | | | |
| Temperature, °F | — | 760 | 760 | 760 | 760 |
| LHSV, v/v/hr. | — | 0.50 | 0.48 | 0.49 | 0.49 |
| Pressure, psig | — | 1500 | 1500 | 1500 | 1500 |
| Catalyst Age, hr. | — | 157–205 | 157–205 | 159–207 | 163–211 |
| Liquid Product Inspections | | | | | |
| Recovery, wt.% | — | 96.0 | 96.0 | 95.5 | 95.8 |
| RI at 60° C | 1.5087 | 1.4605 | 1.4637 | 1.4611 | 1.4619 |
| Gravity, °API | 19.5 | 33.3 | 32.5 | 33.0 | 32.6 |
| Color, ASTM | D8.0 | 3.0 | L3.5 | L3.5 | L3.5 |
| Sulfur, wt.% | 2.59 | 0.02 | 0.13 | 0.06 | 0.09 |
| Nitrogen, ppm | 1040 | 16 | 110 | 75 | 59 |
| 850° F⁻ Conversion[1], wt.% | 12.0 | 61.5 | 58.6 | 59.0 | 60.3 |

[1] By G.C. Distillation

The heavy vacuum gas oil was a 850°–1050° F distillate from Light Arabian crude having a sulfur content of 2.59 wt.% based on total feed and a nitrogen content of 0.1 wt.% based on total feed.

In the hydrotreating of the Light Arabian HVGO at 720° F, after air regeneration, the hydrodesulfurization and hydrodenitrogenation activities of the spent catalyst had been considerably reduced compared to fresh catalyst. After ultrasonic post-treatment, the regenerated catalyst desulfurization and denitrogenation activities were improved as shown in Table IV but in this case the activities of the regenerated-ultrasonic insonated catalysts were slightly less than that for fresh catalyst. Furthermore, ultrasonic treatment of the regenerated catalyst with 35 watts at 19 kHz appeared to be optimum for improved nitrogen removal. The ultrasonic treatment did not significantly alter the conversion activity of the catalyst relative to the regenerated catalyst.

Table V shows that for the more severe hydrotreating of the Light Arabian HVGO at 760° F, the regenerated-ultrasonic insonated catalysts were again considerably more active for hydrodesulfurization and hydrodenitrogenation than the regenerated catalyst. In this case ultrasonic treatment with 35 watts at 19 kHz appears optimum for improvement of the catalyst hydrodesulfurization activity while treatment with 80 watts at 90 kHz appears optimum for improvement of hydrodenitrogenation activity. As was the case for hydrotreating the HVGO at 720° F, the activities of the regenerated-ultrasonic insonated catalysts were less than those for fresh catalyst. Again the ultrasonic treatment did not significantly alter the conversion activity of the catalyst relative to fresh or regenerated catalyst.

The foregoing examples show that ultrasonic insonation following air regeneration of a spent hydrotreating catalyst markedly increases the hydrodesulfurization and hydrodenitrogenation activity of the regenerated catalyst, thus giving closer to the fresh catalyst activity. In addition, for hydrocracking naphthenic feedstock (TJ102 distillate), ultrasonic treatment almost doubles the conversion activity of the regenerated catalyst.

This ultrasonic treatment can also be used with equal effectiveness prior to catalyst regeneration. Furthermore, said treatment can also be used in connection with chemical regenerative processes.

What is claimed is:

1. A method for reactivating a permanently deactivated hydrocarbon conversion catalyst which comprises:

(a) oxidizing the catalyst by exposing said catalyst to air at elevated temperatures; and (b) immersing said oxidized catalyst resulting from step (a) in a liquid medium which does not react with the catalyst and applying ultrasonic energy thereto.

2. A method according to claim 1 in which the ultrasonic energy has a frequency of from about 18 to about 500 kHz.

3. A method according to claim 2 in which the frequency is from about 18 to about 22 kHz.

4. A method according to claim 2 in which the ultrasonic energy has a transducer power output of minimally 6 watts per square inch.

5. A method according to claim 4 in which the power output is from about 10 to about 40 watts per square inch.

6. A method according to claim 2 in which the liquid medium is a petroleum oil.

7. A method according to claim 6 in which the petroleum oil is a white oil.

8. A method according to claim 6 in which the petroleum oil is a mineral oil.

9. A method according to claim 2 in which the liquid medium is a solvent for at least a portion of the contaminants deposited on the catalyst.

10. A method according to claim 9 in which the solvent is an organic solvent.

11. A method according to claim 2 in which the catalyst contains a silica/alumina support.

12. A method according to claim 11 in which the catalyst comprises a crystalline aluminosilicate on a silica/alumina support.

13. A method for reactivating a hydrocracking catalyst which has become permanently deactivated by deposits of carbonaceous material and metal oxides thereon, which method comprises the sequential steps of: (a) oxidizing said carbonaceous material off said catalyst by exposing the catalyst to air at elevated temperatures; and (b) immersing the oxidized catalyst from step (a) in a liquid medium which does not react with the catalyst and agitating said medium by ultrasonic energy having a frequency of from about 18 to about 500 kHz.

14. A method according to claim 13 in which the catalyst contains a silica/alumina support.

15. A method according to claim 14 in which the liquid medium is an organic liquid in which a portion of the material deposited on the catalyst is soluble.

16. A method according to claim 14 in which the catalyst is reactivated in the hydrocracking reactor.

17. A method according to claim 13 in which the catalyst comprises a crystalline aluminosilicate on an amorphous silica/alumina support.

18. A method according to claim 17 in which the liquid medium is an organic liquid in which a portion of the material deposited on the catalyst is soluble.

19. A method according to claim 17 in which the catalyst is reactivated in the hydrocracking reactor.

20. In a hydrocracking process in which a petroleum feedstock is cracked in the presence of a catalyst on an amorphous silica/alumina support and said catalyst is regenerated by calcination, which catalyst is subject to permanent deactivation by deposits of carbonaceous material and metal oxide contaminants which cannot be removed by regeneration, the improvement which comprises reactivating the permanently deactivated catalyst by (a) oxidizing said carbonaceous material off the catalyst by exposing said catalyst to air at elevated temperatures and (b) immersing said oxidized catalyst resulting from step (a) in a liquid medium which does not react with the catalyst and agitating said medium by ultrasonic energy having a frequency of from about 18 to about 500 kHz.

21. In a hydrocracking process in which a petroleum feedstock is cracked in the presence of a crystalline aluminosilicate catalyst on an amorphous silica/alumina support and said catalyst is regenerated by calcination, which catalyst is subjected to permanent deactivation by deposits of carbonaceous material and metal oxide contaminants which cannot be removed by regeneration, the improvement which consists essentially of reactivating the permanently deactivated catalyst by (a) oxidizing said carbonaceous material off the catalyst by exposing the catalyst to air at elevated temperatures and (b) immersing said oxidized catalyst in a liquid medium which does not react with the catalyst and agitating said medium by ultrasonic energy having a frequency of from about 18 to about 500 kHz.

* * * * *